United States Patent Office 3,344,117
Patented Sept. 26, 1967

3,344,117
CURING PROCESS FOR EPOXY RESINS
William Randall Bamford, West Kilbride, and Hector MacDonald McCaa, Saltcoats, Scotland, assignors to Imperial Chemical Industries Limited, London, England, a corporation of Great Britain
No Drawing. Filed May 14, 1965, Ser. No. 455,986
Claims priority, application Great Britain, May 27, 1964, 21,960/64
7 Claims. (Cl. 260—47)

ABSTRACT OF THE DISCLOSURE

There is provided a proces for curing epoxy resins with a curing agent containing tetrakis(2-carboxyethyl) cyclohexanones and cyclopentanones and derivatives thereof. The curing agent may also contain a curing accelerator comprising a tertiary amine and also a further acid anhydride.

---

This invention relates to a process for curing epoxy resins and to resins cured thereby.

Dicarboxylic acids are commonly used for curing epoxy resins and the anhydrides of certain tri- and tetra-carboxylic acids are also sometimes used to obtain more highly cross-linked resins. These tri- and tetra-carboxylic acid anhydrides have the further advantage that smaller quantities may be used and the products usually have higher heat distortion temperatures and higher compressive strengths. However, these tri- and tetra-carboxylic acid anhydrides usually have low solubility in epoxy resins and are therefore difficult to incorporate therein. Thus, for example, when using pyromellitic dianhydride, it is necessary to heat the mixtures to high temperatures in order to obtain clear solutions, having very short pot life, or else to form a suspension of the curing agent in the epoxy resin and to use an eccelerator to speed gelation and so prevent the curing agent settling.

We have found that certain tetrakis(2-carboxyethyl) cyclohexanones and cyclopentanones and derivatives thereof are especially valuable curing agents for epoxy resins.

In the epoxy resin curing process of the present invention, the curing agent comprises a compound of the general formula

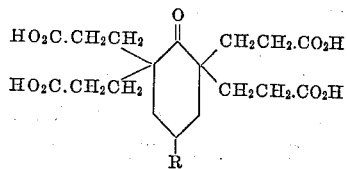

or

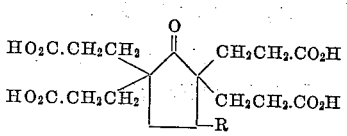

wherein R is hydrogen or a hydrocarbon radical or a substituted hydrocarbon radical, or an anhydride or an alkyl or alkenyl partial ester thereof.

The acid curing agents used in this invention have surprisingly high solubility in epoxy resins; for example, a 30 weight percent solution of 2,2,6,6-tetrakis(2-carboxyethyl)cyclohexanone in an epoxy resin of pp'-diphenylol-2,2-propane and epichlorhydrin having an epoxide equivalent of 175 to 210 ("Epikote 828" R.T.M.) can be obtained at 200° C. without foaming, whereas most acids are insoluble in epoxy resins and cause bad foaming on curing. These acid curing agents are further advantageous in that they are not hygroscopic.

The acid anhydride curing agents used in this invention, because of their polymeric nature, have no tendency to sublime during the curing process. The use of accelerators in the curing process is unnecessary because of the good solubility of the curing agents in epoxy resins, but the curing may be accelerated, if desired, by the use of the catalysts normally employed in curing epoxy resins. One preferred catalyst for this purpose comprises a tertiary amine such as, for example, benzyldimethylamine. Further acid anhydrides, such as maleic, phthalic and hexahydrophthalic anhydrides, may be used in conjunction with the curing agents of the process of the invention to modify the properties of the cured resins.

The cured resins have good colour and flexibility. They can be used for potting, encapsulating and impregnating electrical components and for making small castings. They are also useful as surface coatings and components of bonding compositions for laminated structures.

The invention is further illustrated by the following examples in which all parts are by weight.

Example 1

100 parts of "Epikote 828" resin and 40 parts of 2,2,6,6-tetrakis(2-carboxyethyl)cyclohexanone were stirred at 195° C. for 5 minutes after which the mixture was poured into a mould and cured at 150° C. for 24 hours and at 200° C. for 2 hours to give a clear, tough, straw-coloured resin, which was flexible, chemically resistant and electrically insulating and was particularly suitable for potting electrical components subject to mechanical shock.

Example 2

38 parts of hexahydrophthalic anhydride and 20 parts of 2,2,6,6-tetrakis(2-carboxyethyl)cyclohexanone were fused together at 170° C. and 100 parts of "Epikote 828" resin preheated to 80° C. were added with stirring. The clear mixture was cured by heating at 100° C. for 16 hours to give a resin with properties similar to those of the product of Example 1.

Example 3

38 parts of "Epikote 828" resin preheated to 80° C. were added to a mixture of 15 parts of 2,2,6,6-tetrakis-(2-carboxyethyl)cyclohexanone anhydride and 14.2 parts of hexahydrophthalic anhydride at 80° C. The temperature was raised to 130° C. over a period of 1 hour after which the mixture was cured at 150° C. over 40 hours to give a pale yellow resin suitable for making small electrical castings and laminates.

Example 4

15 parts of 2,2,6,6-tetrakis(2-carboxyethyl)cyclohexanone anhydride and 9 parts maleic anhydride were heated at 100° C. and 38 parts "Epikote 828" resin were added with stirring. The mixture was heated up to 130° C. over a period of 1 hour and cured in a mould by heating at 130° C. for 1½ hours, and at 150° C. for 16 hours. The product was a pale brown resin with properties similar to those of the product of Example 1.

Example 5

1 part of the dimethyl ester of 2,2,6,6-tetrakis(2-carboxy-ethyl)cyclohexanone and 1 part of "Epikote 828" resin were thoroughly mixed at 80° C. and then heated to 140° C. for ½ hour. The mixture was poured into a mould and heated at 160° C. for 16 hours to give a clear, tough resin with properties similar to those of the product of Example 1.

Example 6

2 parts of 2,2,6,6-tetrakis(2-carboxyethyl)cyclohexanone were dissolved in 10 parts of "Epikote 828" resin at 200° C. The clear mixture was cooled and dissolved in 12 parts of acetone. This solution was coated on glass and metal surfaces heated at 150°C. for 16 hours and gave tough, clear, electrically insulating coatings. The film or aluminium foil did not craze or crack on bending.

Example 7

19 parts of 2,2,5,5-tetrakis(2-carboxyethyl)cyclopentanone and 38 parts of hexahydrophthalic anhydried were heated at 190° C. and 100 parts "Epikote 828" resin were added with stirring. The mixture was rapidly cooled to 80° C. and cured to a tough, clear resin by heating at 100° C. for 16 hours. The product was generally similar to the product of Example 1 and was especially suitable for encapsulating electrical components.

Example 8

41 parts of 2,2,6,6-tetrakis(2-carboxyethyl)-4-methyl cyclohexanone anhydride and 24 parts maleic anhydride were fused together at 110° C., and 100 parts of "Epikote 828" resin were added with stirring. After heating at 150° C. for 16 hours the mixture cured to a hard pale brown resin which had properties similar to those of the product of Example 1.

Example 9

100 parts of "Epikote 828" were added to a fused mixture of 20 parts of 2,2,5,5-tetrakis(2-carboxyethyl)-3-methylcyclopentanone and 38 parts of hexahydrophthalic anhydride at 180° C. The mixture was cooled to 80° C., poured into a mould and cured at 100° C. for 16 hours. The product was a pale yellow resin with properties similar to those of the product of Example 7.

Example 10

10 parts of the dimethyl ester of 2,2,6,6-tetrakis(2-carboxyethyl)cyclohexanone and 30 parts of a condensation product of pp'-diphenylol-2,2-propane and epichlorhydrin having an epoxide equivalent of 870–1025 ("Epikote 1004" R.T.M.) were stirred together at 140° C. for 15 minutes. The mixture was cooled and dissolved in 90 parts of acetone. The solution was applied as a coating to aluminium foil and left to allow the solvent to evaporate. The residual film was cured by heating at 160° C. for 16 hours. The film coating on the aluminium foil was tough and flexible and had properties similar to those of the product of Example 1.

Example 11

163.5 parts of an epoxy resin (epoxide equivalent 217) were heated to 100° C. and 43.8 parts of 2,2,6,6-tetrakis (2-carboxyethyl)cyclohexanone were added in portions with stirring whilst the mixture was rapidly heated to 170° C. When all the 2,2,6,6-tetrakis(2-carboxyethyl) cyclohexanone had dissolved, the temperature was reduced to 80° C. and 77 parts of hexahydrophthalic anhydride, followed by 0.9 part of benzyldimethylamine, were added with stirring. The mixture was transferred to a mould and cured by heating at 150° C. overnight to give a pale yellow resin with properties similar to those of the product of Example 1.

Example 12

8.75 parts of 2,2,6,6-tetrakis(2-carboxyethyl)cyclohexanone anhydride were mixed with 7.7 parts of hexahydrophthalic anhydride and heated to 100° C. with stirring. When the 2,2,6,6-tetrakis(2-carboxyethyl)cyclohexanone was completely dissolved the clear liquid was cooled to 65° C. and 21.8 parts of an epoxy resin (epoxide equivalent 217) and 0.4 part of benzyldimethylamine were added with stirring.

The mixture was transferred to a mould and heated to 150° C. The mixture solidified after 10 minutes and was cured overnight at 150° C. to a product similar in properties to the product of Example 1.

What we claim is:
1. A process for curing an epoxy resin having 1,2 epoxide groups wherein the curing agent comprises a compound of the general formula

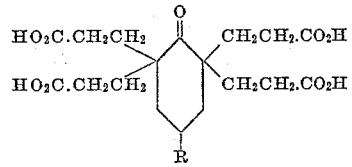

or

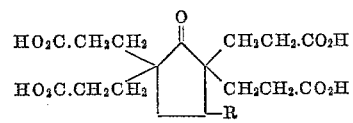

or an anhydride or an alkyl ester or partial ester thereof wherein R is hydrogen or a hydrocarbon radical.

2. A process as claimed in claim 1 wherein the curing agent comprises 2,2,6,6-tetrakis(2-carboxyethyl)cyclohexanone, 2,2,5,5-tetrakis(2-carboxyethyl)cyclopentanone, 2,2,6,6-tetrakis(2-carboxyethyl)-4-methylcyclohexanone, or 2,2,5,5-tetrakis(2-carboxyethyl)-3-methylcyclopentanone.

3. A process as claimed in claim 1 wherein a curing accelerator comprising a tertiary amine is employed.

4. A process as claimed in claim 3 wherein the tertiary amine comprises benzyl dimethylamine.

5. A process as claimed in claim 1 wherein a further acid anhydride is used in conjunction with the curing agent specified in claim 1.

6. A process as claimed in claim 5 wherein the anhydride comprises maleic, phthalic, or hexahydrophthalic anhydride.

7. An epoxy resin whenever prepared by a process as claimed in claim 1.

References Cited

UNITED STATES PATENTS 3,275,599    9/1966    Petropoulos et al. _____ 260—47

OTHER REFERENCES

Lee et al.: "Epoxy Resins," p. 15 relied on, McGraw-Hill Book Co., Inc., New York, 1951.

WILLIAM H. SHORT, Primary Examiner.

T. D. KERWIN, Assistant Examiner.